United States Patent [19]

Szalai et al.

[11] 4,260,042
[45] Apr. 7, 1981

[54] EXPANDER FOR INTERNAL SHOE DRUM BRAKES

[75] Inventors: Gábor Szalai; László Albrecht; Péter Szij, all of Győr, Hungary

[73] Assignee: Magyar Vagon- Es Gepgyar, Győr, Hungary

[21] Appl. No.: 113,663

[22] Filed: Jan. 21, 1980

Related U.S. Application Data

[63] Continuation of Ser. No. 901,833, May 1, 1978, abandoned.

[51] Int. Cl.³ .............................................. F16D 65/22
[52] U.S. Cl. ................................................... 188/330
[58] Field of Search .............................. 188/327–330, 188/332, 338, 343

[56] References Cited

U.S. PATENT DOCUMENTS

| | | | |
|---|---|---|---|
| 2,277,577 | 3/1942 | Boldt | 188/329 X |
| 2,369,259 | 2/1945 | Simpkins et al. | 188/330 X |
| 3,368,648 | 2/1968 | Brownyer | 188/330 |

*Primary Examiner*—Duane A. Reger
*Attorney, Agent, or Firm*—Young & Thompson

[57] ABSTRACT

An expander for internal shoe drum brakes comprises involute working surfaces which are derived from mutually eccentric base circles of equal diameters. The base circles are symmetrically arranged with respect to the axis of rotation of the expander. Upon rotation of the expander the arms of the braking forces initially increase and then decrease whereby a constant relation between angular expander displacements and retarding torques can be obtained.

2 Claims, 6 Drawing Figures

EXPANDER FOR INTERNAL SHOE DRUM BRAKES

This is a continuation of application Ser. No. 901,833, filed May 1, 1978, now abandoned.

This invention relates to expanders for internal shoe drum brakes.

BACKGROUND OF THE INVENTION

Internal shoe drum brakes include at least one pair of brake shoes which are oppositely arranged with respect to one another within a brake drum in such a manner that one pair of adjacent ends of brake shoes is pivotally mounted on a back plate while the other pair of adjacent ends engage with an expander. Upon rotation of the expander the ends of the brake shoes engaged therewith will be mutually displaced and brake linings on the outer shoe surfaces caused to contact the inside surface of the brake drum. Such type of drum brakes is described e.g. in British Patent Specification No. 1,194,743 which is herewith incorporated by reference. Contact between brake shoe linings and brake drum surface results in a drag of retarding torque which is the greater, the greater the force transmitted by the expander.

A constant relation between angular displacements and retarding torques is a basic requirement with respect to brakes in general and to vehicle brakes in particular since then same reactions on a driver's part have the same braking effects and, thereby, less mental concentration is needed during driving which is a considerable factor with heavy duty vehicles such as trucks and busses. However, the required constancy is, as a rule, frustrated by the behaviour of brake linings and their counterparts. Readjustments to eliminate a wearing away of contacting surfaces has been proved insufficient for reestablishing an originally adjusted relation between braking force and retarding torque because, in addition to their sizes, also the physical properties of contacting pairs undergo a change which is due to frequent mechanical and thermal loads caused by braking operations.

SUMMARY OF THE INVENTION

The main object of the present invention is to eliminate the aforesaid inconsistency and to establish a constant relation between braking force and retarding torque in expander actuated internal shoe drum brakes the expander of which consists —in a manner known per se— of an axially extending stem with a longitudinal axis and of a pair of transversely extending curved lever arms on said stem. The lever arms carry each a convex involute working surface which define each an angular range around the longitudinal axis of the expander stem. The angular ranges extend between a first limit line and a second limit line both of which pass through the aforesaid longitudinal axis.

With the known expanders of such type both involute working surfaces were produced by employing a common base circle which was coaxial with the axis of the expander stem. Consequently, upon angular displacements of the expander the arms of forces acting on adjacent brake shoe ends remained the same and, thus, also the expanding forces would remain constant. Then, however, for reasons already explained, the braking effect or, more exactly, the retarding torque of the drum brake obviously could not remain constant and the relation between expanding forces and angular expander displacements would the more deteriorate, the greater the number of braking operations.

In order to compensate such deteriorations and, thereby, to obtain a constant relation between angular expander displacements and retarding torque the expanding forces ought to be varied in dependence on the former. It has now been recognised that such interdependence (between expanding forces and angular expander displacements) can suitably be obtained if the involute working surfaces are produced by individual rather than by common base circles which are, then, eccentric with respect to one another. Actually, the centers of both base circles will lie on the circumference of a central circle, the center of which coincides with the expander stem axis. The base circle centers occupy opposite positions on the central circle circumference along a diameter within the above mentioned angular ranges. With such arrangement the arms of forces will vary with angular expander stem displacements in such a manner that corresponding variations of the expanding forces and, thus, a constant relation between expanding forces and angular expander stem displacements may be obtained which means a practically straight characteristic curve of braking aimed at by the invention.

It will be shown that the arms of forces will, upon rotation of the expander, vary from a maximum to a minimum length and their variations may even include an initial range wherein the arm lengths increase with angular displacements of the expander stem. Then the desired compensation will be even more perfect since initial retarding torque increases are duly considered as well.

Further details of the expander according to the invention will be described hereinafter by taking reference to the accompanying drawings which show an exemplified embodiment of the invention and in which.

Figure 1:
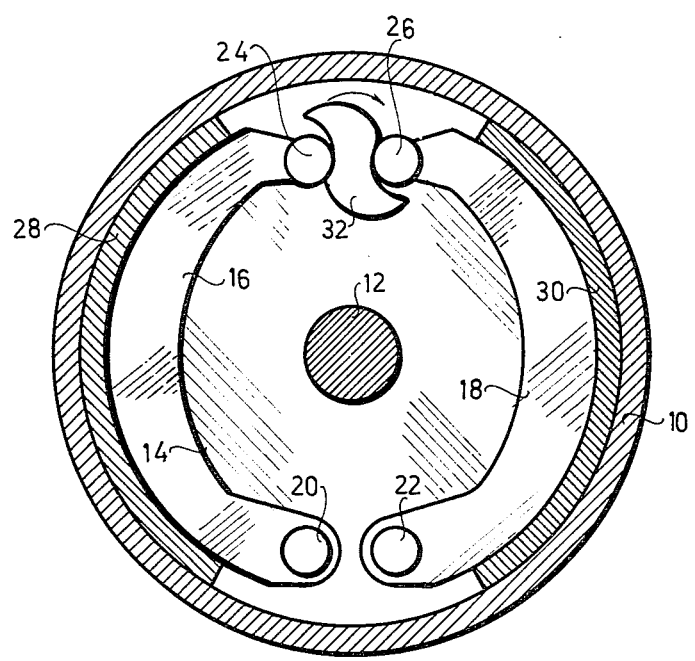
FIG. 1 shows a sectional view of an expander actuated drum brake of conventional design yet provided with an expander according to the invention.

In the drawings, FIG. 1 shows a brake drum 10 and an axle or shaft 12 with a back plate 14 arranged in a conventional manner. The back plate 14 carries a pair of diametrically opposed crescent shaped brake shoes 16 and 18 which are pivotally fixed to it at one pair of their adjacent ends around pivots 20 and 22, respectively. At the other pair of adjacent ends the brake shoes 16 and 18 carry rollers 24 and 26, respectively, supported in any suitable manner not shown. Furthermore, the brake shoes 16 and 18 are provided each with a brake lining 28 and 30, respectively, destined to contact with the cylindrical inner surface of the brake drum 10 while the rollers 24 and 26 lie against an expander 32 by which they can be spaced apart against expansion springs in a conventional manner. For sake of clarity the springs are not represented in the drawing.

Figure 2:
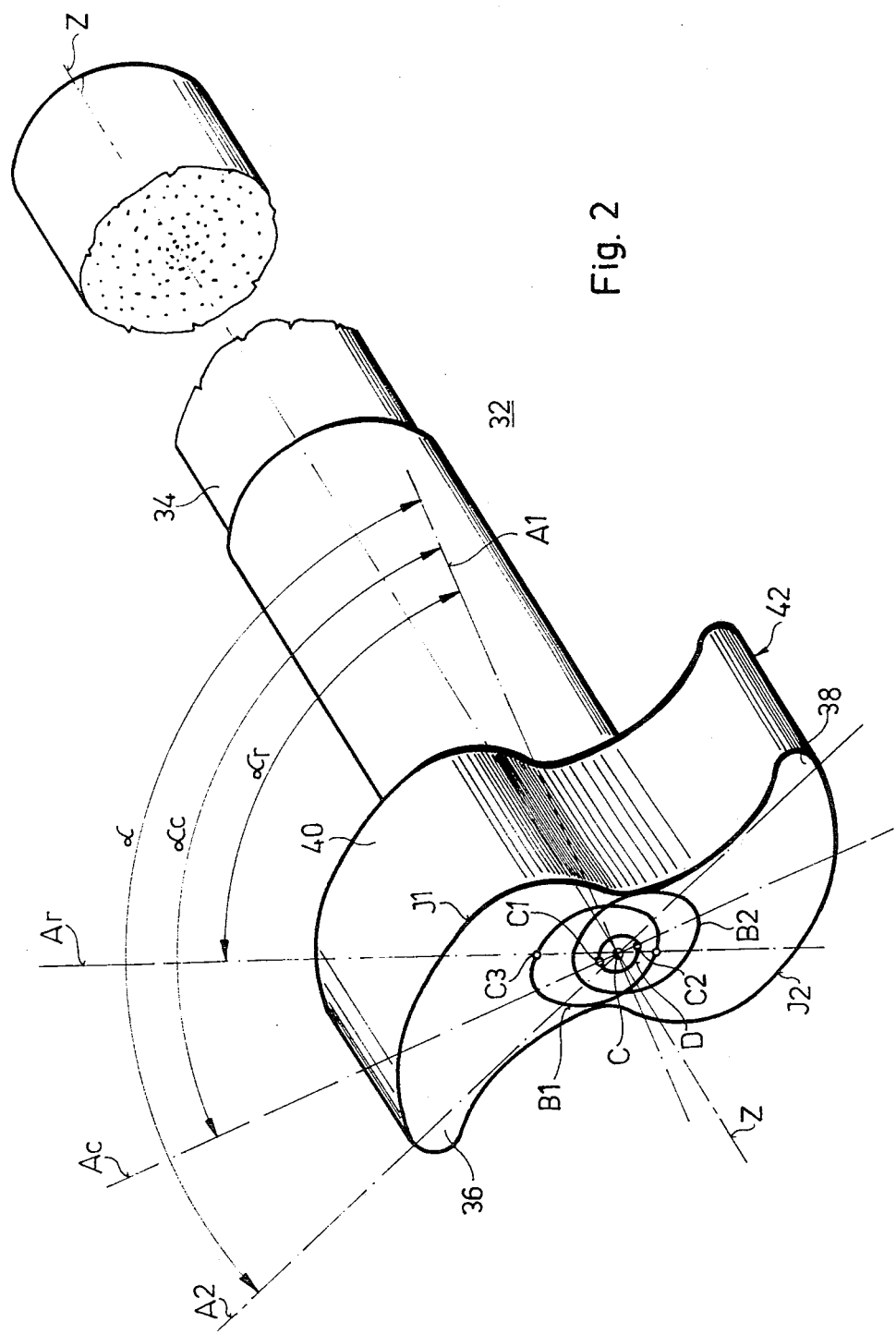
FIG. 2 represents a perspective view of the new expander.

FIG. 2 shows details of the expander 32. It has an axially extending stem 34 with a longitudinal axis Z. The stem 34 has a pair of transversely extending curved lever arms 36 and 38 fixed to it which are arranged inversely with respect to one another. They carry convex axial involute working surfaces 40 and 42 with involutes I1 and I2, respectively, which define an angular range alpha between a first limit line A1 and a second limit line A2 around the longitudinal axis Z. The limit lines A1 and A2 pass, on the one hand, through the longitudinal axis Z at a centre C and, on the other hand, through the initial and final point of the involutes I1 and I2 as will be seen hereinafter.

How, in compliance with the main feature of the invetion the involutes I1 and I2 have similar yet separate base circles B1 and B2 the centres C1 and C2 of which lie diametrically opposite on the circumference of a central circle D coaxial with centre C and, thus, with longitudinal axis Z. Centres C1 and C2 define a control line Ac which, in turn, encloses a control angle alpha c with the first limit line A1 and, thus, goes through the longitudinal axis Z within the angular range alpha. The control angle alpha c is at least as great as a reference angle alpha r enclosed by the first limit line A1 and a further or reference line Ar which likewise passes through centre C and, furthermore through centre of curvature C3 of involute I1 associated with its crossing point with first limit line A1.

Figure 3:
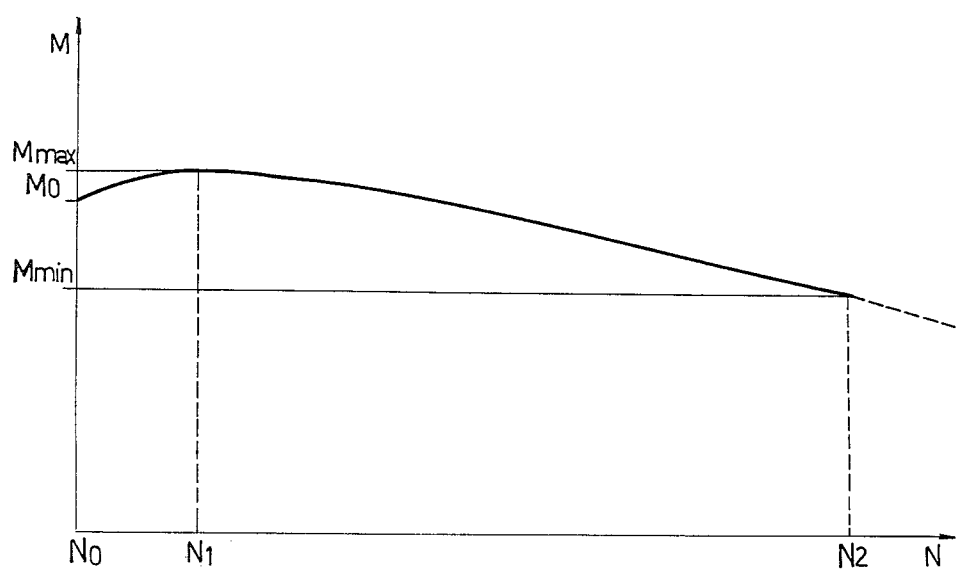
FIG. 3 is a diagram.

FIG. 3 shows the significance of such arrangement. In the illustrated diagram retarding torques M are plotted against number N of braking operations. The retarding torque I1 of new drum brakes or shoe linings has an initial value Mo. As a rule, with the first braking operations the retarding torques increase until contacting surfaces between brake linings and brake drum completely fit one another. This wearing-in period lasts until a maximum value Mmax of retarding torque is reached at a number N1 of braking operations. Such increase of the retarding torque of the brake drum can be compensated only if the arms of the expanding forces become longer because then the forces themselves will suitably decrease.

With further operations beyond N1 the retarding torques will continuously deteriorate until a minimum of retarding torque Mmin is obtained at a number N2 of braking operations. In order to compensate such deterioration, the arms of forces have to be decreased because then the forces themselves will increase and the retarding torque will remain constant.

All that will now be explained by taking reference to FIGS. 4 to 6 which show the geometrical features of various mutual positions of expander and force transmitting rollers.

As is known, each point of an involute has a centre of curvature associated with it which, in turn, lies on the circumference of an associated base circle from which the involute is derived, and defines with the respective involute point a radius of curvature. The radius of curvature is tangential to the base circle circumference. Thus, in the instant case, the involute I1 is derived from the base circle B1 while involute I2 is derived from the base circle B2. Their centres C1 and C2, respectively, lie on the circumference of the central circle D diametrically opposite with respect to one another.

Figure 4:
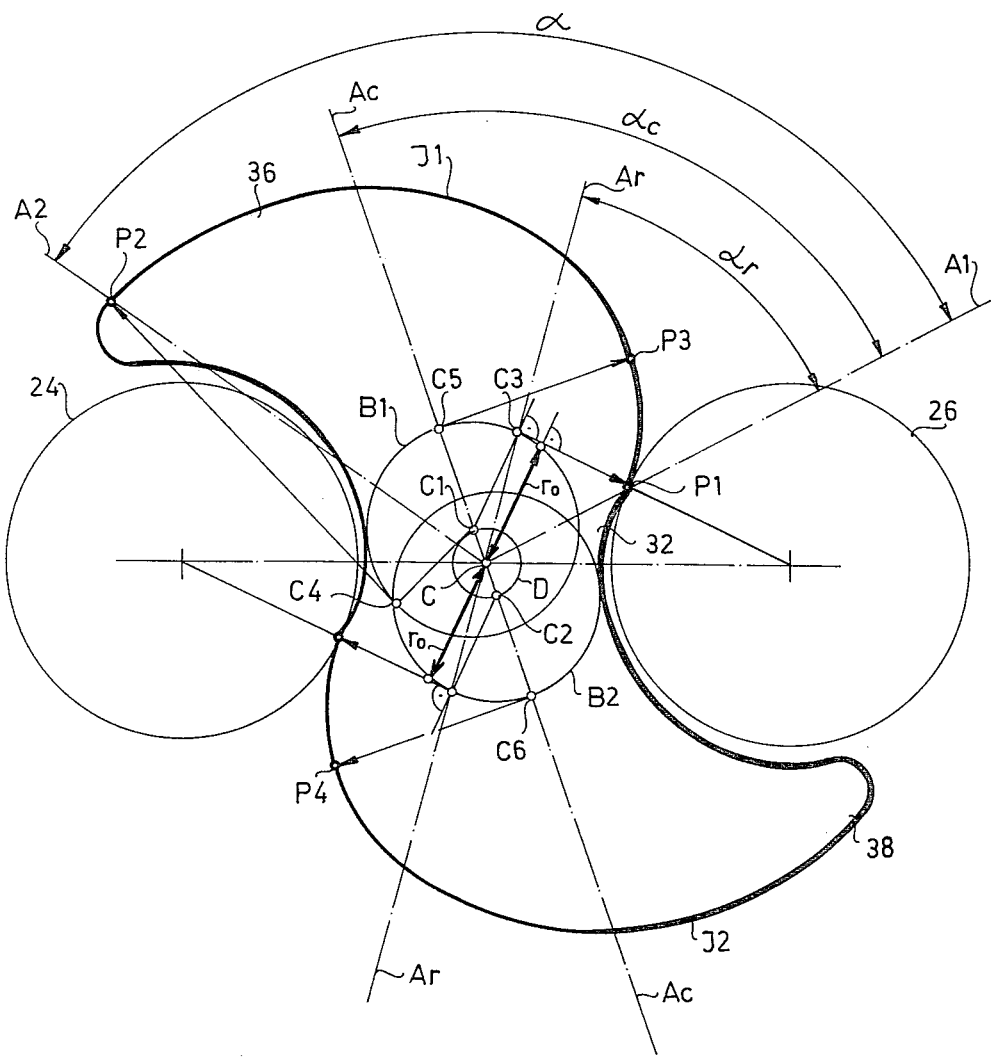
FIGS. 4 to 6 illustrate various operational positions of the expander.

FIG. 4 represents expander and rollers in their initial mutual positions. It is seen that limit lines A1 and A2 pass through the centre C and through a first and a last point P1 and P2, respectively, of involute I1. Same relationships apply to involute I2. The initial point P1 of involute I1 has a centre of curvature C3 associated with it which lies on the circumference of base circle B1. In the same manner, the final point P2 of involute I1 has a centre of curvature C4 likewise on the circumference of base circle B1.

Furthermore, it is seen that the centres C1 and C2 of the base circles B1 and B2, respectively, define the control line Ac which passing through the centre C diametrically crosses both base circles B1 and B2. The control line Ac encloses the angle alpha c with the first limit line A1. On the other hand, centre C and centre of curvature C3 define the reference line Ar which encloses the reference angle alpha r with the first limit line A1. It will be appreciated that, in the instant case, control angle alpha c is greater than reference angle alpha r. Such mutual sizes ensure that, upon rotation of the expander around its axis Z (FIG. 2) in the clockwise direction as regards the drawing, the arms of expanding forces transitorily increase which means a transitory decrease of the expanding forces and, thus, a compensation of the initial increase of the retarding torque as has been explained above in connection with the diagram shown in FIG. 3.

In the represented initial position (FIG. 4) the convex involute surface 40 (FIG. 2) contacts the roller 26 along an axial line passing through point P1. The expanding force acting on roller 26 at this point passes through centre of curvature C3, and its value depends on the distance of the radius of curvature C3 - P1 from the centre C which is the arm of expanding force associated with involute point P1 and referred to by reference sign $r_o$.

Figure 5:
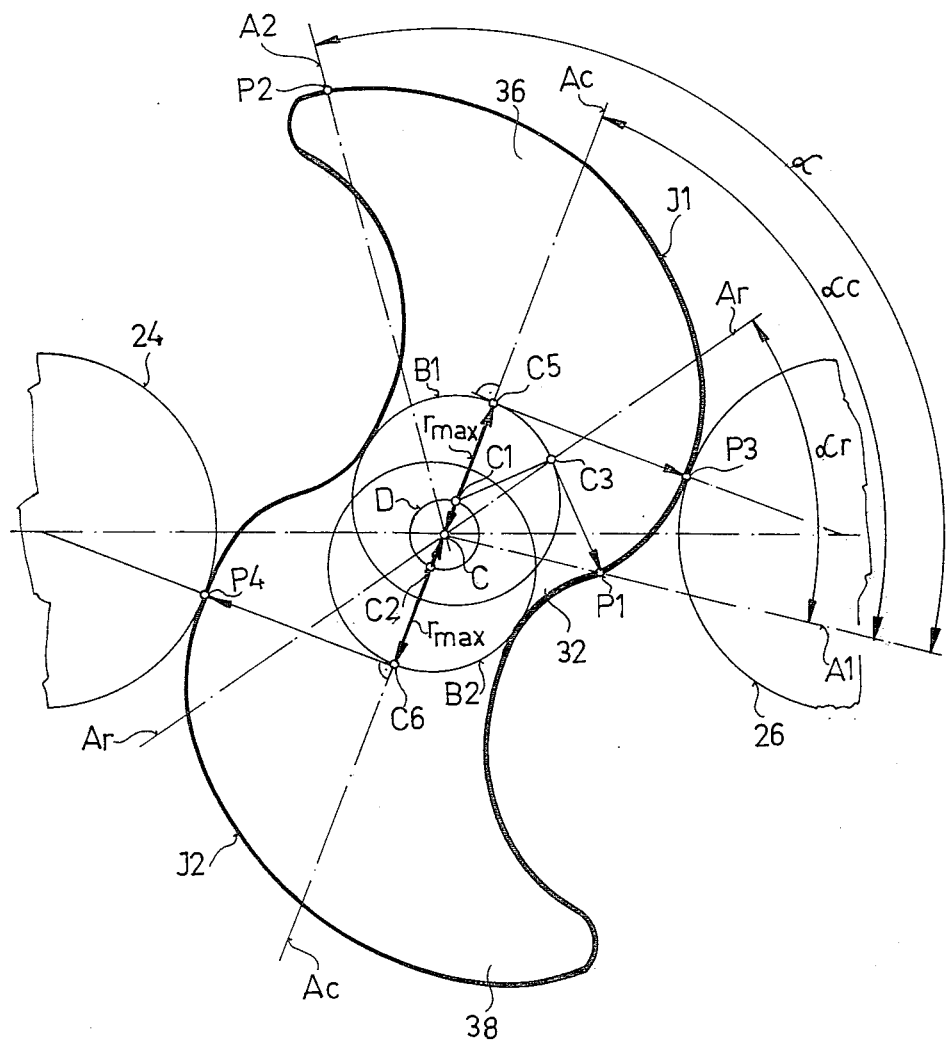

When the expander is rotated in the clockwise direction as regards the drawing, the lengths of the arms of the expanding force increase until the control line Ac occupies a position wherein contact between lever arms 36 and 38 and rollers 24 and 26 takes place at involute points P3 and P4 of involutes I1 and I2, respectively, as shown in FIG. 5. Then, the arms of expanding forces are the distances between centre C and the centres of curvature C5 and C6, respectively, referred to by reference signs $r_{max}$. Consequently, the arms of the expanding forces go, in addition to the centre C, also through the centres C1 and C2 of the base circles B1 and B2, respectively, along aligned diameters thereof.

Figure 6:
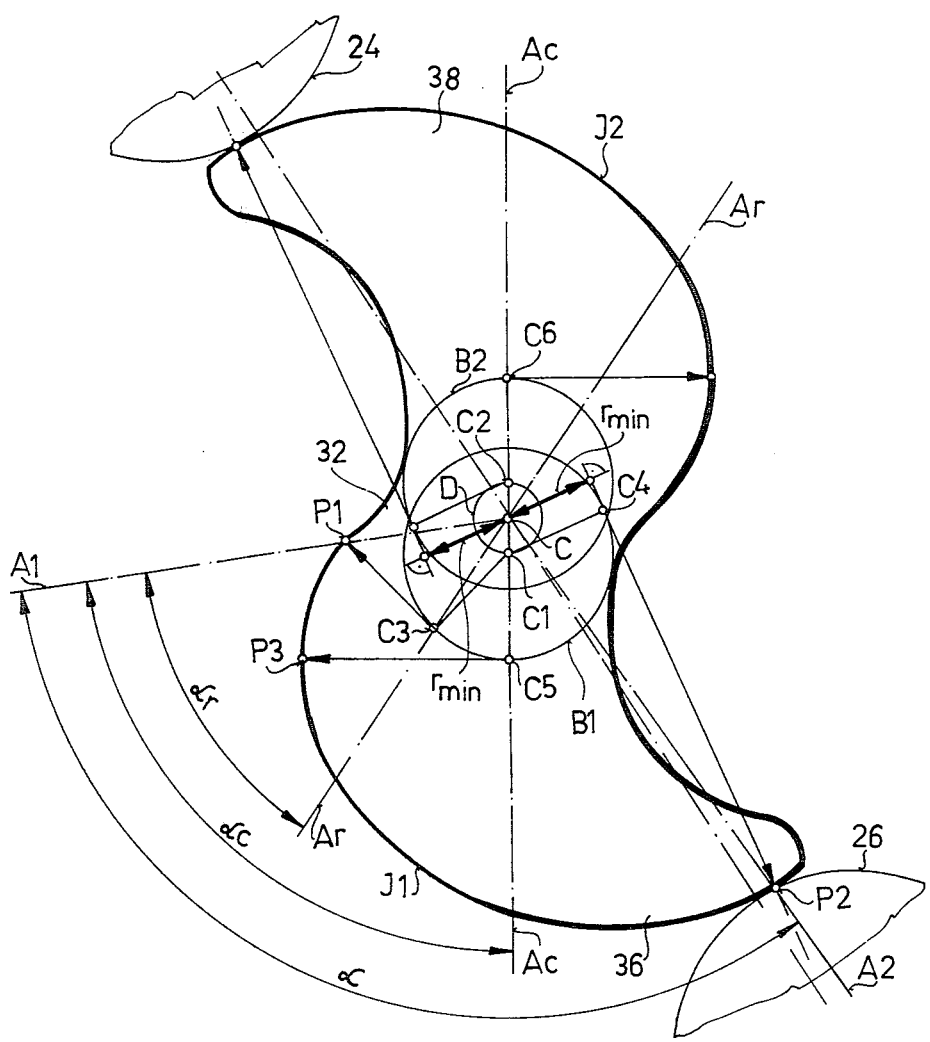

Upon further rotation of the expander 32 in the former direction eventually the mutual positions of expander 32 and rollers 24 and 26 shown in FIG. 6 are reached. In this position, it is involute point P2 at which involute I1 contacts the circumference of roller 26. Here, the expanding force acts on an arm $r_{min}$.

Similar relations apply to lever arm 38 and roller 24.

It will be apparent that in the course of rotating the expander 32 from an initial angular position illustrated in FIG. 4 through an intermediate position shown in FIG. 5 to a final angular position as represented in FIG. 6 the arms of expanding forces initially increase from a value $r_o$ to a maximum value of $r_{max}$ and then decrease to a minimum value of $r_{min}$. Such variation can readily be comprehended since, excepting mutual positions according to FIG. 5, the arms of expanding forces are oriented along chords of base circles B1 and B2, and, thus, are necessarily shorter than in case of FIG. 5 where they register with diameters thereof.

In practice, the expander according to the invention will be designed by first establishing the characteristic curve (M, N) of a drum brake of the selected type yet with a conventional expander. Then, the number of brake operations N1 associated with the abscissa of the maximum value $M_{max}$ represents a basis for the selection of the various angles alpha, alpha c and alpha r the values of which will preferably lie within the following ranges:

$$ac - ar = 15° \text{ to } 35°$$

$$a = 90° \text{ to } 120°$$

$$ac = 60° \text{ to } 90°$$

The diameter of central circle D will preferably have the value of $$D = (2 \text{ to } 10) \text{ millimeters}$$

It will be appreciated that the expander according to the invention practically does not differ from conventional expanders except for the geometry of its involute surfaces so that its manufacturing costs are, in spite of their increased usefulness, much the same.

Hereinbefore the invention has been described with respect to an expander where torque variations have been compensated even in the range between No and N1. Obviously, where requirements are less rigorous or manufacturing precision permits it, a compensation in such initial range may be dispensed with. In this case aplha c will be equal to alpha r.

What is claimed is:

1. An expander for mutually displacing adjacent ends of diametrically opposed brake shoes of internal shoe drum brakes of the type consisting of an axially extending stem with a longitudinal axis and of a pair of transversely extending curved lever arms on said stem carrying convex axial involute working surfaces the involutes of which have similar base circles and define each an angular range around said longitudinal axis between a first limit line and a second limit line both limit lines passing through said longitudinal axis, a central circle with its center on said longitudinal axis, the centers of the base circles lying diametrically opposed on the circumference of said central circle and defining a control line passing through said longitudinal axis within said angular range, said control line enclosing a control angle with said first limit line, the centers of curvature associated with involute points on said first limit line and lying on the circumferences on said base circles defining a reference line which encloses a reference angle with said first limit line, said control angle being at least equal to said reference angle, the center of each base circle being disposed on the same side of said longitudinal axis as its associated involute working surface.

2. In an expander as claimed in claim 1, the improvement of the control angle being greater than the reference angle.

* * * * *